United States Patent Office 2,899,176
Patented Aug. 11, 1959

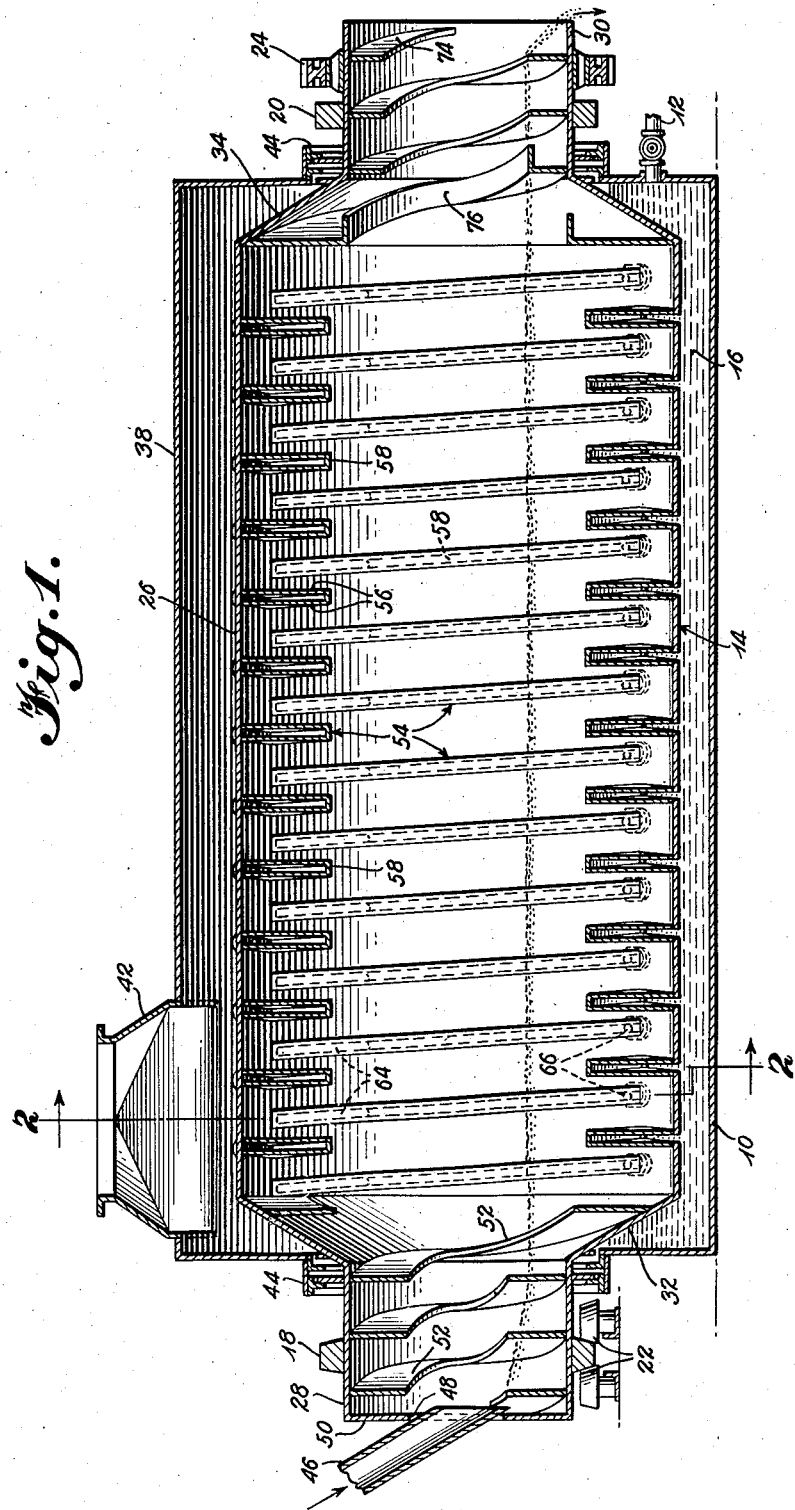

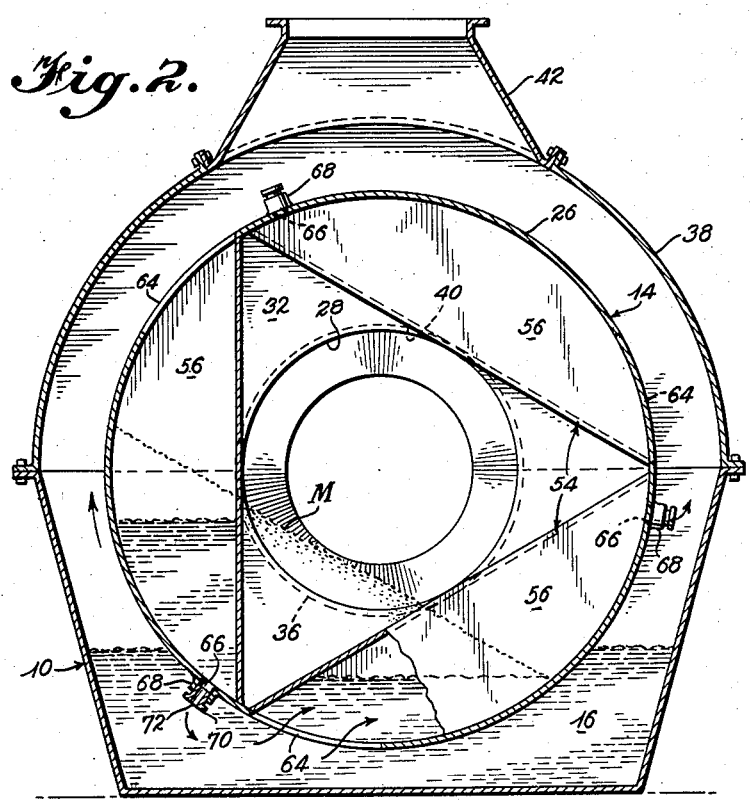
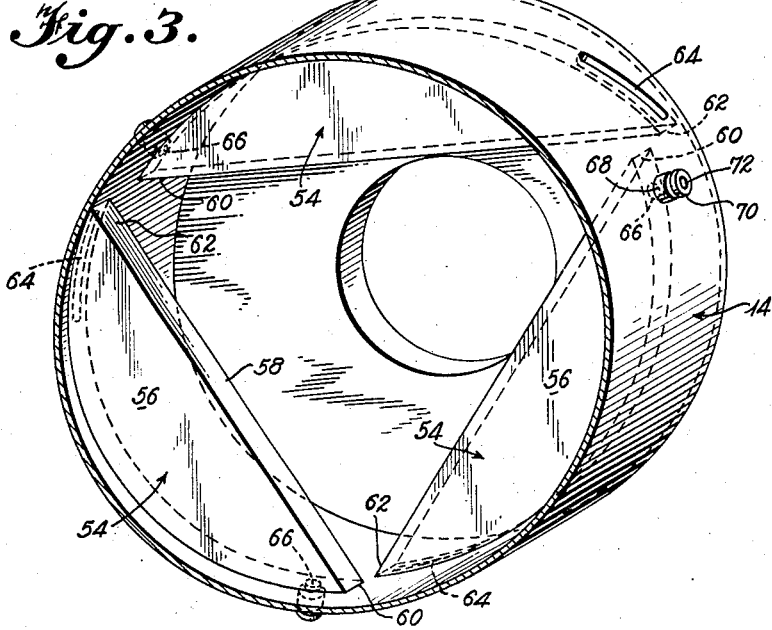

2,899,176

HEAT EXCHANGER

Norman L. Francis, La Grange, and Maurice J. Erisman, Oak Park, Ill., assignors to Link-Belt Company, a corporation of Illinois Application January 22, 1958, Serial No. 710,564

7 Claims. (Cl. 257—86)

This invention relates to heat exchange devices and deals more particularly with apparatus for feeding flowable solids through a zone where heat is added to or extracted from the solids.

A primary object of the invention is to provide a flowable solids heat exchanger wherein a high percentage of the solids passing through the exchanger is exposed to direct contact with heat transfer surfaces.

Another object of the invention is to provide a flowable solids heat exchanger having heat transfer surfaces oriented to exert both a positive feeding and a mixing action on the solids passing through the heat exchanger.

Still another object of the invention is to provide a flowable solids heat exchanger wherein the conveying motion of the device is employed to continuously circulate heat exchange fluid over the heat transfer surfaces at a selectively controlled rate.

Other objects and advantages of the invention will become apparent by reference to the following specification taken in conjunction with the accompanying drawings.

In the drawings,

Figure 1 is a longitudinal, vertical sectional view of a heat exchanger embodying the invention;

Figure 2 is a transverse, vertical sectional view taken approximately along line 2—2 of Fig. 1, and;

Figure 3 is a partial isometric view of the rotating drum structure of the heat exchanger.

The structure disclosed in the drawings is especially adapted to function as a cooling device for handling flowable solids, such as soybean meal, detergents, sugar, ores, chemicals or similar materials. While the construction and operation of the apparatus disclosed in the drawings will be described in its application to cooling operations, it will become apparent from the description that the device is equally adaptable for use in heating operations.

Referring now particularly to Figs. 1 and 2, an elongated tank 10 is provided with a valved conduit 12 through which a heat transfer or cooling fluid, such as water, may be supplied to the interior of the tank 10. A hollow cylindrical drum, designated generally 14, is supported for rotation about a horizontal axis with the drum partially submerged in the body of cooling fluid 16 maintained within the tank 10. The rotary support for the drum 14 includes two concentric hardened steel tires, one near each end of the drum as at 18 and 20. Each drum tire is rotatably supported by a pair of rollers, not shown, one on each side of the vertical plane on which the sectional view of Fig. 1 is taken. This provides a four point support for the drum 14. To prevent undesired movement of the drum 14 in an axial direction, one of the tires, such as the tire 18, may be engaged by a pair of axially spaced rollers 22, as shown in Fig. 1. The drum 14 is rotated by connecting a suitable source of power to a driven gear or sprocket 24 located adjacent one end of the drum.

Referring now to Fig. 1, the drum 14 includes an enlarged central section 26, a feed end section 28 and a discharge end section 30 which are concentrically disposed and of reduced diameter relative to the central section. The feeding end section 28 and the discharge end section 30 are rigidly secured to the central portion 26 by conical end wall sections 32 and 34, respectively.

As best seen in Fig. 2, the level of the cooling fluid, or water, maintained within the tank 10 is located below the lowest portion of the feeding and discharge end sections and the end walls of the tank 10 are cut away as at 36 to permit the end sections to pass freely beyond the end walls of the tank. A cover member 38 is mounted upon the tank 10 to provide a complete enclosure for the central section 26 of the drum 14. Like the tank 10, the end walls of the cover 38 are cut away as at 40 to permit the feed end section 28 and the discharge end section 30 to project freely from the interior of the enclosure. A vent 42 is provided for the escape of vaporized cooling fluid from the interior of the cover 38. Suitable seal means 44 are provided at each end of the enclosure and surround the projecting feed and discharge end sections, as best seen in Fig. 1.

Material to be cooled is introduced to the interior of the drum 14 by means of a tube or chute 46 which projects inwardly through an opening 48 in the end wall 50 of the feed end section 28. The interior surface of the feed end section 28 is provided with two helical, internal screw conveyor flights 52 which continue from the inner end of the feed end section 28 along the interior wall of the conical portion 32 to the left-hand (Fig. 1) end of the central section 26.

A plurality of hollow, plate-like flights, generally designated 54, are fixedly mounted on the interior surface of the drum 14. Each of the flights 54 is of identical construction and the following description is equally applicable to all.

Each flight includes a pair of parallel side plates 56 having the shape of a segment of a circle. The side plates are secured to each other along their chordal edges by an edge plate 58. The side plates 56 and edge plate 58 may be formed from a single piece of sheet material or may be fabricated as by welding. The circular edges of the respective plates 56 are secured to the inner surface of the drum 14 as by welding. Each of the flights thus defines a chamber which is sealed from but extends through the interior of the drum 14.

The flights are mounted at an inclination to the longitudinal axis of the drum 14, as best seen in Fig. 1, to define a discontinuous internal conveying screw for moving material from left to right through the drum 14. The "screw" defined by the flights 54 is not a true helix because the side plates 58 of the flights lie in planes and are not curved to conform to a helical surface. The discrepancy between the approximate helix defined by the flights 54 and a true helix may be best appreciated by comparing the showing of the flights 54 in Fig. 1 with the showing of the true helixes represented by the screws 52 and 74. The trailing end 60 of each flight 54 is both axially and circumferentially offset from the leading end 62 of the next adjacent flight. The conveying screw defined by the flights 54 is discontinuous not only in the sense that the flights are interrupted in a circumferential extent but also in the sense that the trailing end 60 (see Fig. 3) of each flight is offset axially from the leading edge 62 of the next preceding flight.

As best seen in Fig. 3, each of the flights 54 communicates with the external surface of the drum 14 at both its leading end 62 and its trailing end 60. At the leading end of each flight 54, a relatively large opening 64 is cut through the wall of the drum 14. Adjacent the trailing end of each flight, a relatively small opening 66 is bored and a short annular flange 68 is sealingly secured, as by welding, to the drum to surround the opening 66. The internal surface of the annular flange 68 may be threaded to receive a plug 70 having an orifice 72 of a predetermined cross sectional area. The function of the orifice plug 70 is to regulate the rate at which water may flow from the chamber within the associated flight 54 when the flight is being elevated during the rotary movement of the drum 14. By interchangeably using a number of plugs 70 having orifices of differing cross sectional area, the rate of flow of cooling fluid from the chamber within a flight 54 may be regulated in accordance with the characteristics of the flowable solids being handled in the drum 14.

As is the case with the feed end section 28, the discharge end section 30 is provided with two helical, internal screw conveyor flights 74 oriented to convey material from the interior of the central section 26 through the open outer end of the discharge section 30. Because of the fact that the central section 26 is of greater diameter than the discharge end section 30, the discharge flights 74 are continued from the inner end of the discharge section 30 along the interior wall of the conical end section 34. To efficiently scoop up material from the radially outermost portion of the central section 26, the discharge flights 74 are each provided with an axially extending flange 76 along that portion of the flight 74 located in the conical section 34.

The operation of the structure described above is as follows: Cooling fluid is supplied to the interior of the tank 10 through the valved conduit 12 which, as will be noted from Fig. 1, is connected to the tank adjacent the discharge end of the drum 14. Depending upon the particular cooling operation, fluid may be supplied from the conduit 12 either continuously or intermittently to replace fluid evolved through the vent 42 in the form of vapor or steam. In some instances, it may prove desirable to provide a continuous flow of cooling fluid through the tank 10 in a direction countercurrent to the flow of material through the drum 14, and in such an instance an overflow or drain opening, not shown, may be provided at the end of the tank 10 adjacent the feed end of the drum 14.

Material to be cooled is fed through the chute 46 into the end section 28 of the drum 14. Actuation of a conventional driving means, not shown, is then employed to rotate the entire drum assembly 14 through the driven gear or sprocket 24. In the disclosed embodiment, rotation of the drum 14 will be in a clockwise direction in Fig. 2. Rotation of the drum 14 in this direction causes the material to be urged by the screw 52 from left to right (Fig. 1) through the feed end section and into the interior of the drum 14. As previously explained, the various flights 54 located within the drum 14 act as an internal conveying screw and move the flowable solids through the drum 14 in a left to right direction when viewed in Fig. 1.

As the drum rotates, the openings 64 of the various flights are submerged in succession in the manner best shown in Fig. 2. Because of the relatively large area of the openings 64 adjacent the leading ends of the various flights, cooling fluid from the tank 10 flows into the chamber within each of the hollow flights in the manner shown in connection with the lowermost flight 54 illustrated in Fig. 2. Since the opening 66 adjacent the trailing end of the flight is above the surface of fluid within the tank 10 at this time, steam or air is easily expelled to permit free entry of cooling fluid into the interior of the flight. Continued rotation of the drum elevates the flight to a position such as that assumed by the leftwardmost flight 54 in Fig. 2. Since the level of fluid within the flight is now elevated above the surface of the fluid within the tank 10, fluid within the flight tends to flow outwardly through the orifice 72 to return to the tank. By restricting the area of the orifice 72, the rate at which fluid is drained from the flight as the latter is elevated by rotation of the drum may be regulated to keep the fluid within the flight at a relatively high level in order that a substantial amount of cooling fluid is retained in the flight until after the heat transfer surfaces represented by the side walls 56 and edge walls 58 have been rotated upwardly beyond the surface M of the flowable solids being handled by the drum 14. It should be noted that because fluid is permitted to drain from the interior of the flight 54 during this upward movement, a substantial surface of cooling fluid within the flight is maintained to permit the evolvement of vapor which may pass through the opening 64 in a relatively unrestricted manner.

Further rotation of the drum will eventually bring the flight to a position similar to that assumed by the uppermost one in Fig. 2. At this time, any cooling fluid which has not drained from the interior of the flight during the elevating movement is swiftly drained, by gravity, through the opening 64 and returned to the tank 10.

Because of the relatively close spacing of the flights 54, rotation of the drum 14 causes a large number of heat transfer surfaces to continuously move through the flowable solids within the central section 26 of the drum 14. The selectively restricted flow of heat transfer fluid from the individual flights places the heat transfer or cooling fluid in intimate contact with a relatively large percentage of the flowable solids within the drum 14. The continual flow of coling fluid from the tank to the interior of the flights and the return of this fluid to the tank efficiently extracts heat from the flowable solids by continually replacing the fluid in contact, through the heat transfer surfaces, with the flowable solids and, by virtue of the relatively large area of the opening 64 permits relatively unrestricted discharge of any vapors in cases where the temperatures are such as to generate the vapors.

The intimate contact between the various heat transfer surfaces and the flowable solids within the drum is further increased by the discontinuity or axial offset between adjacent flights 54. The discontinuity enables the flights 54 to function not only as a conveyor to move flowable solids through the drum 14 but also permits the flights to impart a mixing action which would not be possible were the flights formed continuous.

While we have described but one embodiment of our invention, it will be readily apparent to those skilled in the art that the specific structure disclosed is capable of modifications. Therefore, the scope of the foregoing description is to be considered exemplary rather than limiting and the true scope of our invention is that defined in the following claims.

Having thus described the invention, we claim:

1. A heat exchange device comprising a tank having a body of heat transfer liquid therein, a horizontally arranged drum supported for rotation about its axis while partially submerged in said body of liquid, means for rotating said drum, a plurality of hollow flights mounted upon the interior surface of said drum, extending circumferentially of said drum, and projecting inwardly to define a discontinuous, internal conveying screw for moving material axially through said drum when the latter is rotated, each of said flights having an opening associated therewith adjacent the leading end thereof to place the interior of the flight in communication with the exterior of said drum to permit liquid to flow from said tank into the interior of the flight during one portion of the rotary movement of the drum and being otherwise substantially enclosed so as to retain a quantity of liquid therewithin after said opening is moved above the surface of said body of liquid by the rotary movement of said drum, said opening permitting liquid to flow from the interior of the flight to said tank when said drum partakes of another portion of its rotary movement.

2. A heat exchange device comprising a tank having a body of heat transfer liquid therein, a horizontally arranged drum supported for rotation about its axis while partially submerged in said body of liquid, means for rotating said drum, a plurality of hollow flights mounted on the interior surface of said drum, extending circumferentially of said drum, and projecting inwardly, each of said flights having opposed flat side surfaces lying in parallel planes inclined with respect to the axis of said drum, each of said flights having an opening associated therewith adjacent the leading end thereof to place the interior of the flight in communication with the exterior of said drum to permit liquid to flow from said tank into the interior of the flight during one portion of the rotary movement of the drum and being otherwise substantially enclosed so as to retain a quantity of liquid therewithin after said opening is moved above the surface of said body of liquid by the rotary movement of said drum, said opening permitting liquid to flow from the interior of the flight to said tank when said drum partakes of another portion of its rotary movement.

3. A heat exchange device comprising a tank having a body of heat transfer liquid therein, a horizontally arranged cylindrical drum supported for rotation about its axis while partially submerged in said body of liquid, means for rotating said drum, a plurality of hollow flights mounted upon the interior surface of said drum and projecting inwardly to define a discontinuous internal conveying screw for moving flowable solids axially through said drum when said drum is rotated, each of said flights having the general shape of a segment of a circle inclined with respect to the axis of said drum and being substantially enclosed except for an opening located adjacent its leading end placing the interior of the flight in communication with the exterior of said drum to permit liquid to flow from said tank into the flight during one portion of the rotary movement of said drum and to permit liquid to flow from said flight into said tank during another portion of the rotary movement of said drum.

4. A heat exchange device comprising a tank having a body of heat transfer liquid therein, a horizontally arranged drum supported for rotation about its axis while partially submerged in said body of liquid, means for rotating said drum, a plurality of hollow flights mounted upon the interior surface of said drum and projecting inwardly of said drum to define a discontinuous internal conveying screw for moving flowable solids axially through said drum when the latter is rotated, each of said flights having a leading end and a trailing end spaced circumferentially of said drum from said leading end with a first opening located adjacent said leading end and a second opening located adjacent said trailing end, both of said openings placing the interior of the flight in communication with the exterior of the drum to permit liquid to flow from said tank into the interior of the flight through said first opening during that portion of the rotary movement of said drum when the first opening is submerged in said body of liquid and to permit liquid to flow from the interior of said flight to said tank through said second opening as said first opening is elevated above the surface of the body of liquid by the rotary movement of said drum, and means associated with said second opening for selectively restricting the rate at which liquid flows therethrough.

5. A heat exchange device as defined in claim 4 wherein each of said flights has the general shape of a segment of a circle having opposed flat side surfaces lying in parallel planes inclined with respect to the axis of said drum.

6. A heat exchange device comprising a horizontally arranged drum having an elongated central section with concentric cylindrical feed and discharge end sections of reduced diameter mounted at respective ends of said central section, a tank having a body of heat transfer liquid threin, means supporting said drum for rotation about its axis with said axis located above said body of liquid to maintain said central section of said drum partially submerged in said body of liquid and said feed and discharge end sctions above the surface of said liquid, means for rotating said drum, a plurality of hollow flights mounted upon the interior surface of said central section of said drum, extending circumferentially of said drum, and projecting inwardly to define a discontinuous internal conveying screw for moving flowable solids axially through said central section toward said discharge end section when said drum assembly is rotated, each of said flights having an opening located adjacent the leading end thereof placing the interior of the flight in communication with the exterior of the drum to permit liquid to flow from said tank into the interior of the flight during a first portion of the rotary movement of the drum and to permit liquid to flow from the interior of the flight to said tank when the later passes through another portion of its rotary movement, and means at the end of said central section adjacent said discharge end section for moving flowable solids from the lowermost portion of the central section to the interior of said discharge end section.

7. In a heat exchange device having a horizontally arranged drum supported for rotation about its axis through a body of heat transfer liquid in which it is partially submerged, the improvement which comprises an inwardly projecting hollow flight mounted upon the interior surface of said drum, said flight having a leading end and a trailing end spaced circumferentially of said drum from said leading end with a first opening located adjacent said leading end and a second opening located adjacent said trailing end, both of said openings placing the interior of said flight in communication with the exterior of the drum, said first opening being of sufficient size to permit the rapid flow of liquid therethrough to the interior of said flight during that portion of the rotary movement of said drum when said first opening is submerged in said body of liquid, and said second opening being of such a size as to restrict the flow of liquid therethrough from the interior of the flight whereby a portion of the liquid is retained within the flight and raised above the surface of the body of liquid as said first opening is elevated above said surface by the rotary movement of said drum.

References Cited in the file of this patent

UNITED STATES PATENTS

| | | |
|---|---|---|
| 321,746 | Newhall | July 7, 1885 |
| 1,741,019 | Harrington | Dec. 24, 1929 |
| 2,298,016 | Lincoln | Oct. 6, 1942 |
| 2,688,468 | Thorstensson-Rydberg | Sept. 7, 1954 |
| 2,822,153 | Arnold | Feb. 4, 1958 |